United States Patent
O'Dea

(10) Patent No.: US 6,496,769 B1
(45) Date of Patent: Dec. 17, 2002

(54) FOUR WHEEL DRIVE ANTI-LOCK BRAKE CONTROL HAVING TORQUE TRANSFER ALLEVIATION

(76) Inventor: Kevin Austin O'Dea, 3137 Earlmoore La., Ann Arbor, MI (US) 48105

( * ) Notice: Subject to any disclaimer, the term of this patent is extended or adjusted under 35 U.S.C. 154(b) by 463 days.

(21) Appl. No.: 09/072,592

(22) Filed: May 4, 1998

(51) Int. Cl.[7] .............................. B60T 7/12; G05D 1/00; G06F 17/00

(52) U.S. Cl. ............................ 701/81; 701/69; 701/71; 701/76; 701/89; 180/247; 180/198

(58) Field of Search .............................. 701/69, 70, 71, 701/75, 78, 79, 81, 82, 83, 84, 88, 89, 90, 91, 92, 87; 180/247, 198; 303/138, 139, 141, 143, 156, 122.06, 176, 186, 190

(56) References Cited

U.S. PATENT DOCUMENTS

| | | | | |
|---|---|---|---|---|
| 4,747,643 A | * | 5/1988 | Lanzer ........................... 303/2 |
| 4,859,002 A | * | 8/1989 | Yoshino ..................... 303/156 |
| 4,912,641 A | * | 3/1990 | Kuwana et al. ............... 701/79 |
| 4,919,494 A | * | 4/1990 | Higashimata et al. ....... 303/156 |
| 5,224,043 A | * | 6/1993 | Tamura et al. ................ 701/86 |
| 5,282,138 A | * | 1/1994 | Sano ............................ 701/81 |
| 5,454,629 A | * | 10/1995 | Johnson ....................... 303/156 |
| 5,662,388 A | * | 9/1997 | Wuerth et al. ................. 303/3 |

OTHER PUBLICATIONS

Anonymous, "4WD ABS Algorithm Enhancement Through Torque Transfer Control", Jul. 1995, Research Disclosure No. 375, p. 506.*

Research Disclosure—Jul. 1995 No. 375 p. 506 #37555 entitled "4WD ABS Algorithm Enhancement Through Torque Transfer Control." Disclosed Anonymously.

* cited by examiner

Primary Examiner—Jacques H. Louis-Jacques
Assistant Examiner—Brian J. Broadhead
(74) Attorney, Agent, or Firm—Jimmy L. Funke

(57) ABSTRACT

A four-wheel drive anti-lock brake control in which the existence of torque transfer between the front and rear wheels of the vehicle is detected based on differences in the duration of ABS control used at each of the independently controlled wheels. Such differences are used to determine a ratio of rear-to-front (or front-to-rear) ABS control. If the ratio indicates the presence of torque transfer, the wheel causing the transfer is identified and its brake pressure released as required to alleviate the detected torque transfer, so long as the release will not cause a change in vehicle deceleration.

3 Claims, 4 Drawing Sheets

US 6,496,769 B1

FOUR WHEEL DRIVE ANTI-LOCK BRAKE CONTROL HAVING TORQUE TRANSFER ALLEVIATION

FIELD OF THE INVENTION

This invention relates to an anti-lock brake system (ABS) for a four-wheel drive vehicle, and more particularly to an ABS system in which torque transfer between the front and rear of the vehicle is detected and alleviated.

BACKGROUND OF THE INVENTION

In four wheel drive vehicles, the front wheels are mechanically coupled to the rear wheels through a transfer case, so that the sum of the front wheel speeds is made equal to the sum of the rear wheel speeds. When the vehicle has an anti-lock brake system (ABS) that is configured to control slip independently at the front and rear wheels, the sum of the front and rear wheel speeds becomes unequal during ABS braking. This results in an undesired torque transfer between the front and rear wheels which can degrade the performance of the ABS control.

It has been proposed to detect the existence of torque transfer based on wheel slip or the brake pressure ratio between the front and rear wheels, but these techniques either provide only limited information or require expensive pressure sensors. In some systems, the pressure may be estimated in lieu of using pressure sensors, but many ABS controls utilize on/off solenoid control, rendering pressure estimation impractical. One example of a known torque transfer detection and control is anonymously disclosed in the July, 1995 issue of Research Disclosure.

SUMMARY OF THE PRESENT INVENTION

The present invention is directed to an improved four-wheel drive anti-lock brake control in which the existence of torque transfer between the front and rear wheels of the vehicle is detected based on differences in the duration of ABS control used at each of the independently controlled wheels. Such differences are used to determine a ratio of rear-to-front (or front-to-rear) ABS control. If the ratio indicates the presence of torque transfer, the wheel causing the transfer is identified and its brake pressure released as required to alleviate the detected torque transfer, so long as the release will not cause a change in vehicle deceleration.

BRIEF DESCRIPTION OF THE DRAWINGS

FIG. 4 is directed to the determination of modulator variables; FIG. 5 is directed to the determination of modulator ratio; FIG. 6 is directed to the determination of torque transfer; and FIG. 7 is directed to the determination of slip and to release intervention for the alleviation of a detected torque transfer.

DETAILED DESCRIPTION OF THE INVENTION

Figure 1:
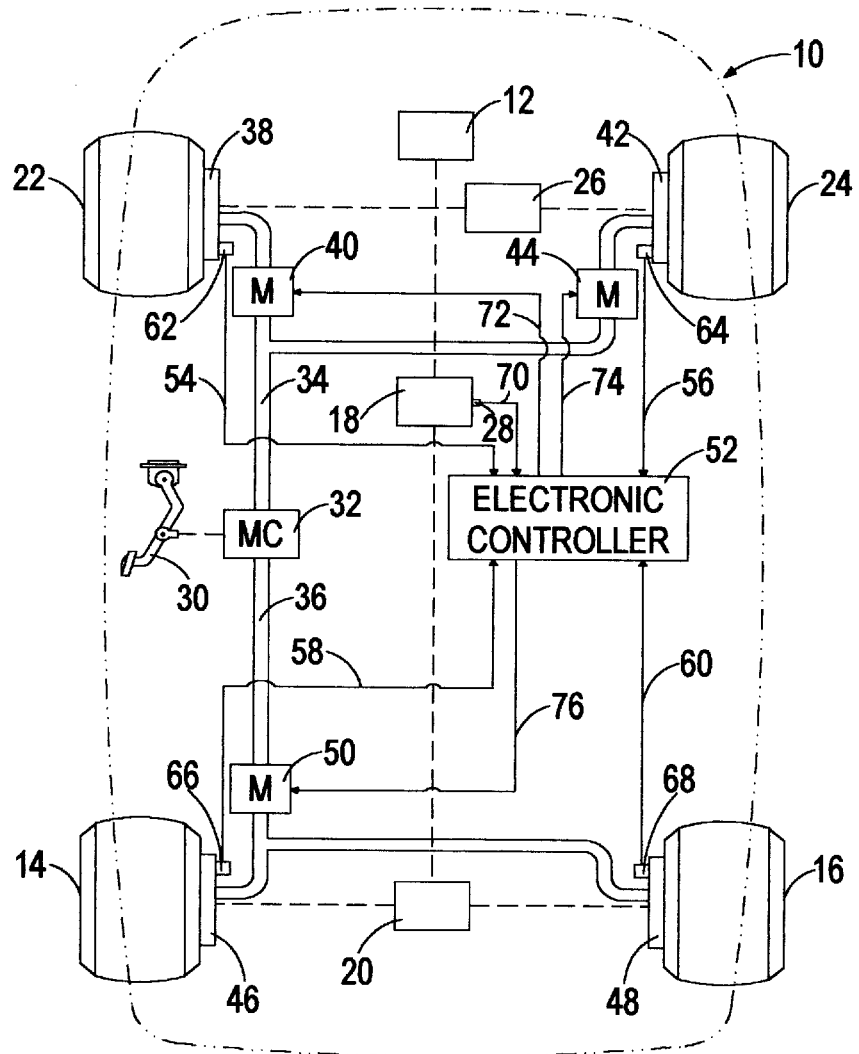
FIG. 1 is a diagram of a four-wheel drive vehicle including an electronic controller and associated input and output devices constituting a control system for carrying out an anti-lock brake control according to this invention.

FIG. 1 depicts a mechanization of an ABS system according to this invention on a four-wheel drive (4 WD) vehicle 10. The vehicle engine 12 is coupled to drive the left and right rear wheels 14, 16 through a transfer case 18 and rear differential 20, as shown. In four-wheel drive operation, the transfer case 18 mechanically couples the rear wheels 14, 16 to the left and right front wheels 22, 24 through front differential 26. The vehicle 10 may be full-time four wheel drive, but is illustrated as having either two-wheel or four-wheel drive capability, the transfer case 18 being equipped with a switch 28 that indicates when 4 WD is in effect.

The vehicle 10 includes a brake system including a brake pedal 30 mechanically coupled to a master cylinder (MC) 32 for producing hydraulic pressure in proportion to the force applied to pedal 30. The master cylinder 32, which may include a pneumatic booster (not shown), proportions the hydraulic pressure among the front and rear brake supply lines 34 and 36 in a conventional manner. Supply line 34 is coupled to the left front service brake 38 via left-front ABS modulator (M) 40, and to the right front service brake 42 via right-front ABS modulator (M) 44. Supply line 36 is coupled to the left and right rear wheel brakes 46 and 48 via rear ABS modulator (M) 50.

An electronic controller 52 receives various inputs, including wheel speed signals on lines 54, 56, 58, 60 from respective wheel speed sensors 62, 64, 66, 68 and a 4 WD signal from switch 28 on line 70. The sensors 62, 64, 66 68 and 28 may be implemented with conventional devices in a manner known to those skilled in the art. In response to the various inputs, the controller 52 develops control signals on output lines 72, 74, 76 for the ABS modulators 40, 44 and 50.

Figure 2:
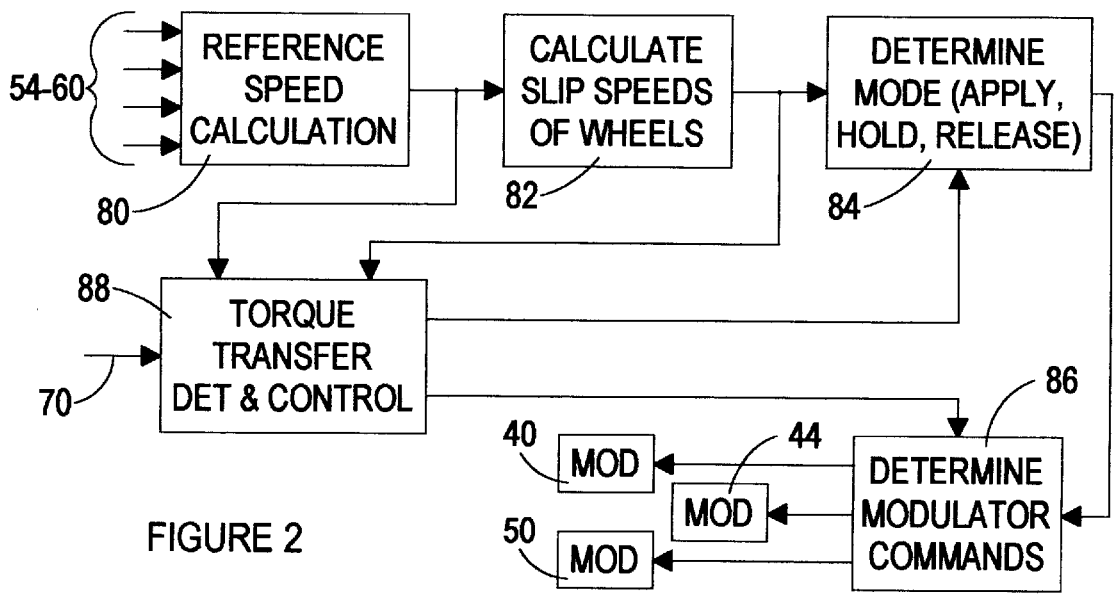
FIG. 2 is a block diagram of an anti-lock brake control carried out by the electronic controller of FIG. 1 according to this invention.

FIG. 2 is a block diagram illustrating the functionality of the electronic controller 52, including the torque transfer detection and correction aspects peculiar to this invention. The wheel speed signals on lines 54–60 are supplied as inputs to the block 80 which calculates the reference speed of the vehicle 10, and the reference speed is supplied to block 82 which calculates the slip speeds of the various wheels 14, 16, 22, 24 and determines whether ABS should be activated. The wheel slip speeds are supplied to block 84 which determines which ABS control mode (apply, hold or release) is appropriate. Block 86 determines modulator commands for each of the modulators 40, 44 and 50 based on the determined ABS control modes. These blocks comprise a conventional ABS control which detects an incipient lock-up condition at one or more of the wheels, and selectively releases the brake pressure to the slipping wheel, holds it at a reduced value, and then in an apply mode, ramps up the brake pressure toward the current or commanded brake pressure for that wheel. In the illustrated embodiment, the ABS control is a three-channel control in which the front wheels are individually controlled with separate modulators 40, 44, and the rear wheels are controlled with a single modulator 50. Other implementations such as two-channel (front/rear) and four-channel (individual wheel) are also possible.

Block 88 is responsive to the reference speed determined at block 80, the wheel slip speeds determined at block 82 and the 4 WD signal on line 70. Based on these inputs, block 88 determines the duration of ABS control used at each of the ABS modulators 40, 44, 50, and computes a ratio of rear-to-front (or front-to-rear) ABS control. If the ratio indicates the presence of torque transfer, the wheel causing the transfer is identified and its brake pressure released by overriding the operation of blocks 84, 86 as required to alleviate the detected torque transfer, so long as the release will not cause a change in vehicle deceleration. According to the invention, the modulator apply mode times are determined and compared to detect the presence of torque transfer. With no torque transfer, the apply times, on average, would all be substantially equal. In the presence of torque transfer, however, the wheels at either the front or rear of the vehicle are decelerated by the torque transfer in addition to the brake forces. Such wheels begin slipping sooner than they otherwise would, resulting in shorter apply times than would occur with no torque transfer. In the illustrated embodiment, the control uses ratios of the apply times to detect torque transfer. For example, if the ratio of the rear modulator apply time to the left front or right front modulator apply time is significantly greater than unity, the control concludes that at least one of the rear wheels is transferring torque to the left or right front wheel. Likewise, if the ratio of the rear modulator apply time to either of the left or right front modulator apply times is significantly less than unity, the control concludes that the left or right front wheel is transferring torque to the rear wheels.

Figure 3:
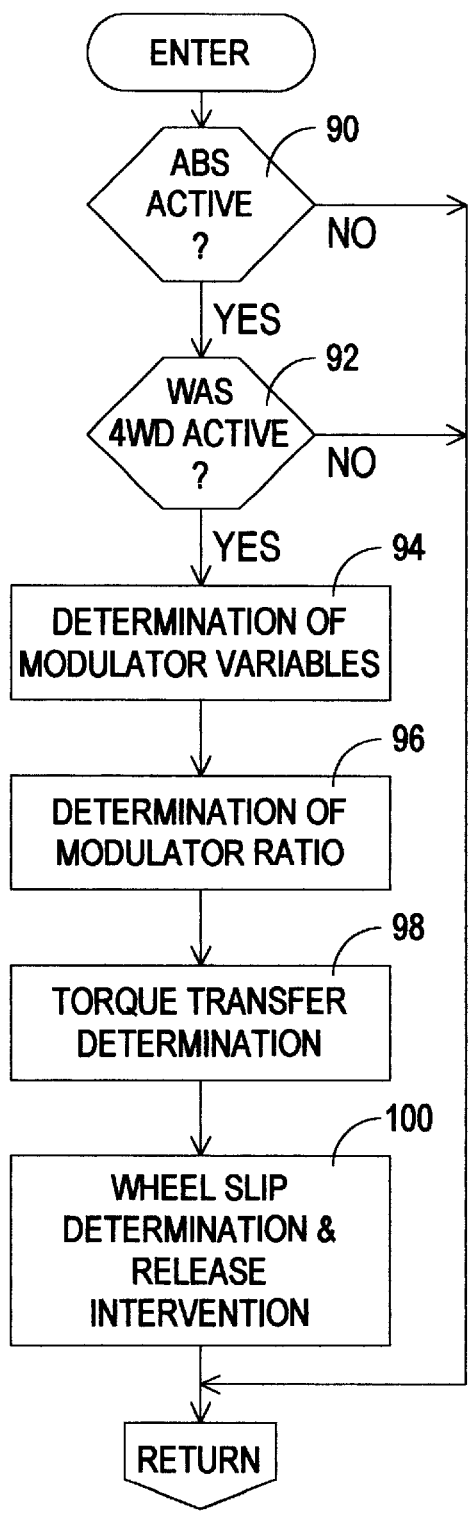
FIG. 3 is a main flow diagram representative of computer instructions executed by the electronic controller of FIG. 1 in carrying out the control of this invention.

In practice, the controller 52 comprises a programmed micro-controller for carrying out the above-described functionality. FIGS. 3–7 depict flow diagrams representative of program instructions executed by the controller 52 in carrying out the portions of the control pertinent to the present invention. As indicated, the torque transfer detection and control function may be implemented as an interrupt service routine in response to a periodically generated interrupt request. FIG. 3 is a main flow diagram for the interrupt service routine, and the flow diagrams of FIGS. 4–7 show certain of the main flow diagram blocks in detail.

Referring to FIG. 3, the blocks 90, 92 determine if four-wheel-drive operation is in effect at the initiation of ABS operation. If so, the blocks 94, 96, 98, 100 are executed to determine certain modulator variables, to determine left and right modulator ratios, to detect the presence of torque transfer, and to determine if any of the controlled brake pressures should be released to alleviate a detected torque transfer condition.

Figure 4:
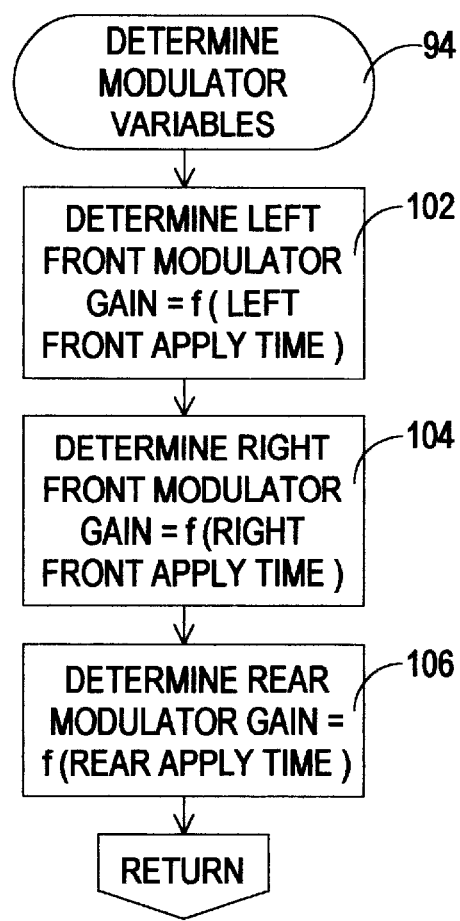
FIGS. 4–7 are flow diagrams setting forth further detail regarding the various flow diagram steps of FIG. 3.

Referring to FIG. 4, the step of determining the modulator variables involves computing a running average of the apply mode times for each of the modulators 40, 44, 50. Block 102 performs this function for the left front modulator 40, producing a Left Front Modulator Gain. Similarly, block 104 produces a Right Front Modulator Gain, and block 106 produces a Rear Modulator Gain.

Figure 5:
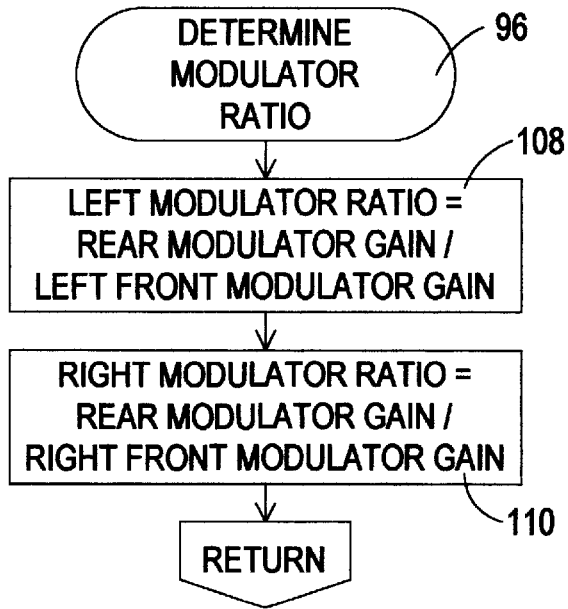

Referring to FIG. 5, the step of determining modulator ratios involves computing a Left Modulator Ratio (block 108) and a Right Modulator Ratio (block 110). The Left Modulator Ratio is defined as the ratio of Rear Modulator Gain to Left Front Modulator Gain; and the Right Modulator Ratio is defined as the ratio of Rear Modulator Gain to Right Front Modulator Gain.

Figure 6:
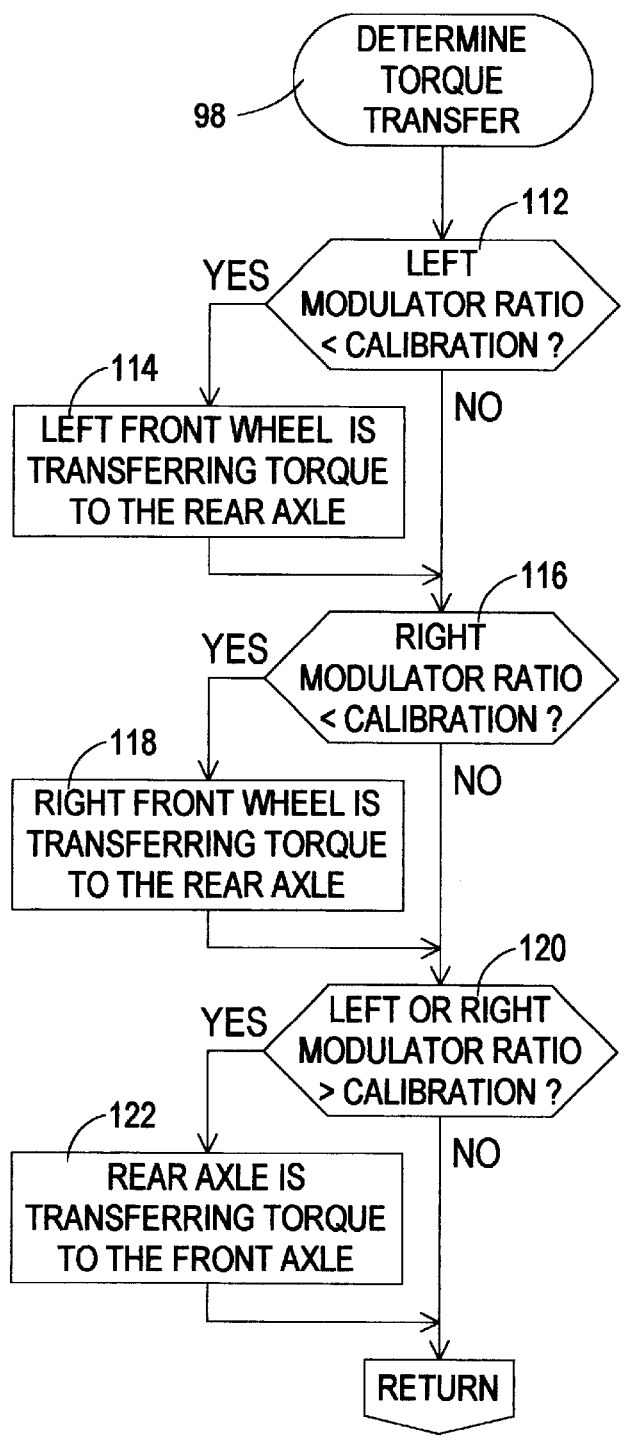

Referring to FIG. 6, the step of detecting torque transfer involves comparing the Left and Right Modulator Ratios to predetermined reference values. If the Left Modulator Ratio is less than a calibrated threshold, as determined at block 112, the block 114 is executed to set a flag indicating that the left front wheel 22 is transferring torque to (i.e., decelerating) at least one of the rear wheels. If the Right Modulator Ratio is less than the calibrated threshold, as determined at block 116, the block 118 is executed to set a flag indicating that the right front wheel 24 is transferring torque to (i.e., decelerating) at least one of the rear wheels. If the Left or Right Modulator Ratio is greater than a calibrated threshold, as determined at block 120, the block 122 is executed to set a flag indicating that at least one of the rear wheels is transferring torque to (i.e., decelerating) the left or right front wheels.

Figure 7:
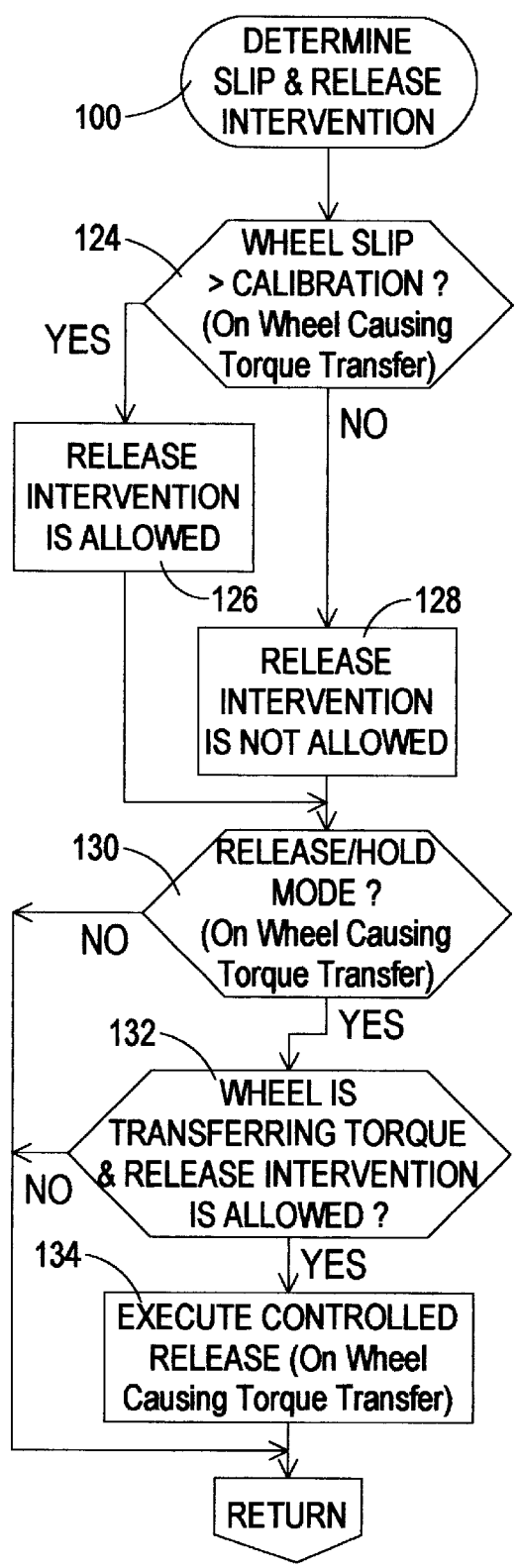

Referring to FIG. 7, determining wheel slip and release intervention, the block 124 is first executed to determine wheel slip for any wheel flagged in block 98, and to compare the wheel slip to a calibration value. If the wheel slip is less than the calibration value, block 128 is executed to inhibit an intervention of the ABS control because releasing the brake pressure at the torque transferring wheel would likely reduce vehicle deceleration, which is undesired. Additionally, the amount of torque transfer in such case is relatively small. On the other hand, if the wheel slip is greater than the calibration value, block 126 is executed to enable intervention of the ABS control in order to alleviate the detected torque transfer. Block 130 determines if a wheel determined to be transferring torque is in the Hold or Release mode. If so, and release intervention is enabled for that wheel, as determined at block 132, and block 134 is executed to increase the brake pressure release for that wheel by a calibrated amount. The increased release reduces the torque transfer, and in subsequent executions of the interrupt service routine, the controller 52 will either continue or discontinue the intervention as required to alleviate the detected torque transfer.

Figure 8:
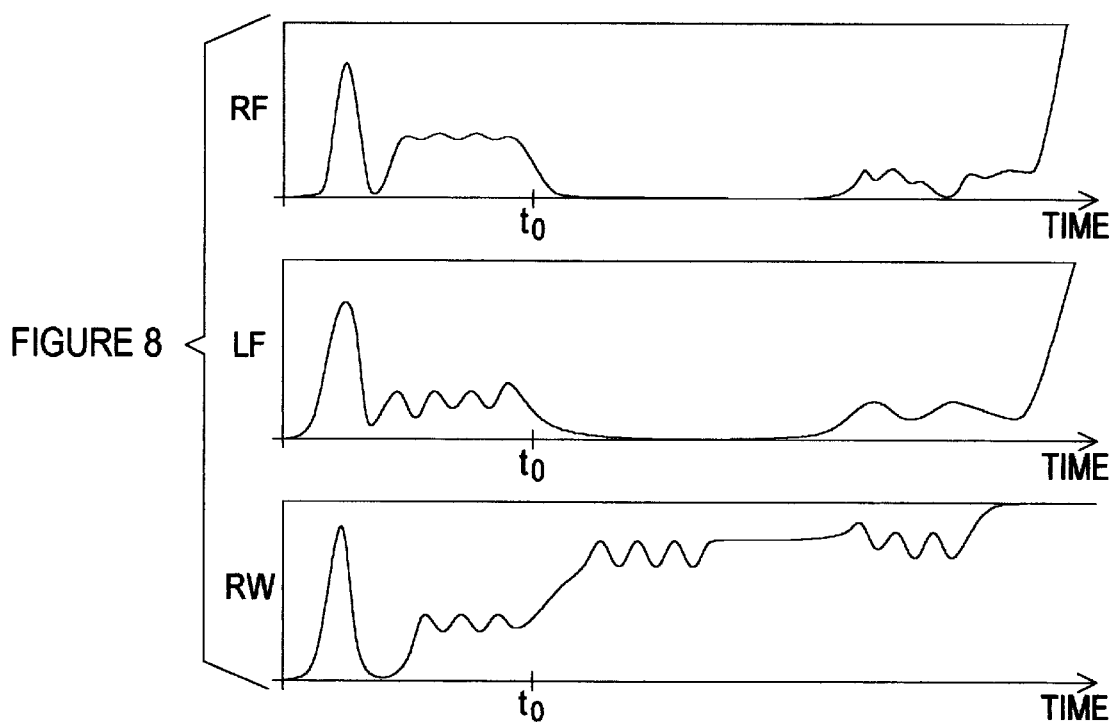
FIG. 8 graphically depicts brake pressures as a function of time for an emergency braking situation involving rear to front torque transfer without the control of this invention.
Figure 9:
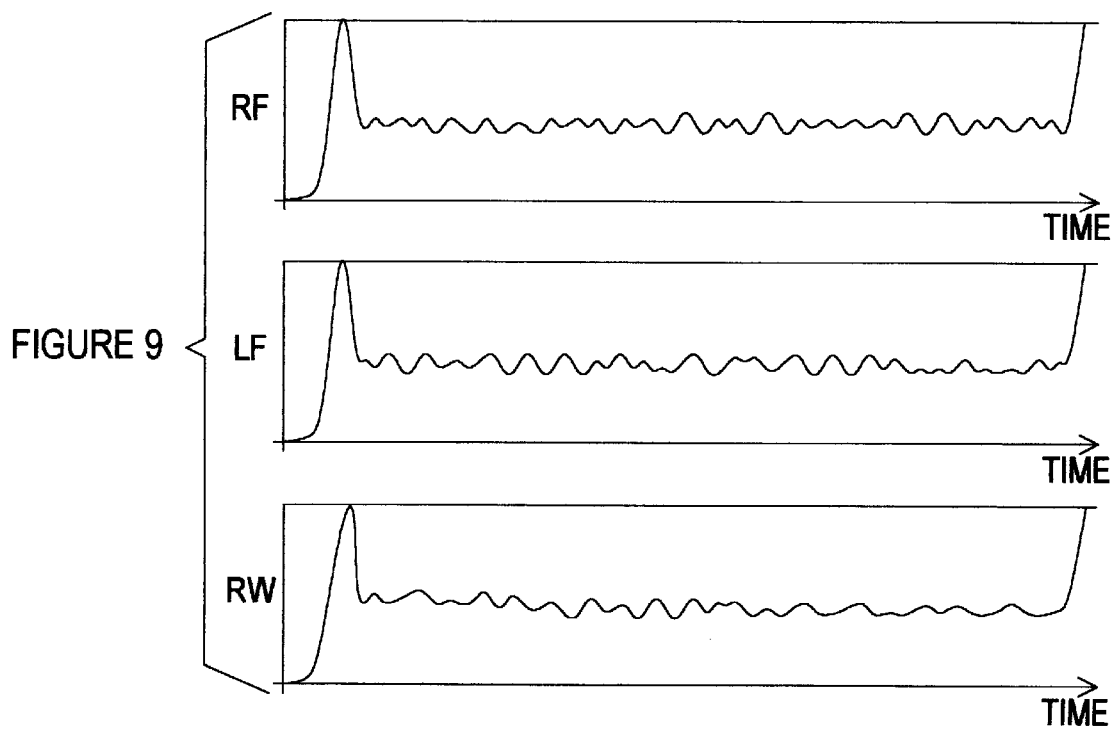
FIG. 9 graphically depicts brake pressures as a function of time for the emergency braking situation of FIG. 8, but with the torque transfer detection and control of this invention.

FIGS. 8 and 9 graphically depict the three controlled brake pressures (right front RF, left front LF, and rear wheel RW) for two emergency stops under similar conditions that tend to result in rear axle-to-front axle torque transfer. In each case, the master cylinder pressure is essentially the same, as indicated by the horizontal trace at the top of each graph. The actual brake pressures only reach the master cylinder pressure near the end of the stop; in the meantime, the ABS control attempts to maintain the brake pressures at lower values chosen to prevent wheel-lock.

In the first stop, depicted in FIG. 8, the control of this invention is deactivated so that the evidence of torque transfer can be observed. Rear-to-front torque transfer begins approximately at time $t_0$, when the rear wheel (RW) brake pressure begins to increase, allowing the rear wheels to decelerate the left and right front wheels. The ABS control responds by releasing the right and left front brake pressures to minimize the front wheel slip.

In the second stop, depicted in FIG. 9, the control of this invention is activated. When the imbalance in the ABS apply time ratios is detected, the rear wheel brake pressure is reduced to substantially eliminate the torque transfer observed in FIG. 8. As seen in FIG. 9, this results in more uniform braking effort at each of the wheels, with only minimal torque transfer effects due to the mechanical coupling between the front and rear wheels.

In summary, this invention provides a control that simply and accurately eliminates torque transfer in 4 WD vehicles with ABS control, without the addition of special sensors for detecting brake pressure. Obviously, various modifications of the illustrated embodiment will occur to those skilled in the art. For example, the control could be applied to a vehicle having electric brakes, or to vehicles having a two or four channel braking system, with only minor modifications. In this regard, it will be understood that the scope of this invention is not necessarily limited by the illustrated embodiment, but is defined by the appended claims.

The embodiments of the invention in which an exclusive property or privilege is claimed are defined as follows:

1. A brake control for a vehicle having mechanically coupled front wheels and rear wheels equipped with pressure activated brakes, comprising:

at least one front brake pressure modulator for cyclically releasing a front pressure supplied to the front wheel brakes in response to a detected slipping of the front wheels and then increasing said front pressure at a controlled rate during a front apply interval until front wheel slipping is detected again;

at least one rear brake pressure modulator for cyclically releasing a rear pressure supplied to the rear wheel brakes in response to a detected slipping of the rear wheels and then increasing said rear pressure at a controlled rate during a rear apply interval until rear wheel slipping is detected again;

means responsive to the cyclic releasing and increasing of said front and rear pressures for determining a relative measure of apply interval as between said front and rear modulators;

means effective when the relative measure reaches a front-to-rear torque transfer threshold for detecting that the front wheels are decelerating the rear wheels through the mechanical coupling, and for increasing the release of said front pressure if a slip speed of said front wheels exceeds a calibrated value; and means effective when the relative measure reaches a rear-to-front torque transfer threshold for detecting that the rear wheels are decelerating the front wheels through the mechanical coupling, and for increasing the release of said rear pressure if a slip speed of said rear wheels exceeds said calibrated value.

2. A brake control for a vehicle having mechanically coupled front wheels and rear wheels equipped with pressure activated brakes, comprising:

a left front brake pressure modulator for cyclically releasing a left front pressure supplied to the left front wheel brake in response to a detected slipping of the left front wheel and then increasing said left front pressure at a controlled rate during a left front apply interval until slipping of the left front wheel is detected again;

a right front brake pressure modulator for cyclically releasing a right front pressure supplied to the right front wheel brake in response to a detected slipping of the right front wheel and then increasing said right front pressure at a controlled rate during a right front apply interval until slipping of the right front wheel is detected again;

a rear brake pressure modulator for cyclically releasing a rear pressure supplied to the rear wheel brakes in response to a detected slipping of the rear wheels and then increasing said rear pressure at a controlled rate during a rear apply interval until rear wheel slipping is detected again;

an electronic controller responsive to the cyclic releasing and increasing of said brake pressures for computing an average apply interval for each of said pressure modulators, determining a left modulator ratio as between the computed apply intervals of said rear modulator and said left front modulator, and determining a right modulator ratio as between the computed apply intervals of said rear modulator and said right front modulator;

means for comparing the left modulator ratio to a front-to-rear torque transfer threshold to detect a first torque transfer condition in which the left front wheel is decelerating the rear wheels through the mechanical coupling, and increasing the release of said left front pressure in response to such detection if a slip speed of the left front wheel exceeds a calibrated value;

means for comparing the right modulator ratio to said front-to-rear torque transfer threshold to detect a second torque transfer condition in which the right front wheel is decelerating the rear wheels through the mechanical coupling, and increasing the release of said right front pressure in response to such detection if a slip speed of the right front wheel exceeds a calibrated value; and means for comparing the left and right modulator ratio to a rear-to-front torque transfer threshold to detect a third torque transfer condition in which the rear wheels are decelerating the left or right front wheels through the mechanical coupling, and increasing the release of said rear pressure in response to such detection if a slip speed of the rear wheels exceeds a calibrated value.

3. A method of operation for a brake control system on a vehicle having mechanically coupled front wheels and rear wheels equipped with pressure activated brakes, comprising the steps of:

cyclically releasing a left front pressure supplied to the left front wheel brake in response to a detected slipping of the left front wheel and then increasing said left front pressure at a controlled rate during a left front apply interval until slipping of the left front wheel is detected again;

cyclically releasing a right front pressure supplied to the right front wheel brake in response to a detected slipping of the right front wheel and then increasing said right front pressure at a controlled rate during a right front apply interval until slipping of the right front wheel is detected again;

cyclically releasing a rear pressure supplied to the rear wheel brakes in response to a detected slipping of the rear wheels and then increasing said rear pressure at a controlled rate during a rear apply interval until rear wheel slipping is detected again;

computing an average apply interval for each of said left front, right front and rear pressures;

determining a first ratio as between the computed apply intervals of said rear pressure and said left front pressure, and determining a second ratio as between the computed apply intervals of said rear pressure and said right front pressure;

comparing the first ratio to a front-to-rear torque transfer threshold to detect a first torque transfer condition in which the left front wheel is decelerating the rear wheels through the mechanical coupling, and increasing the release of said left front pressure in response to such detection if a slip speed of the left front wheel exceeds a calibrated value;

comparing the second ratio to said front-to-rear torque transfer threshold to detect a second torque transfer condition in which the right front wheel is decelerating the rear wheels through the mechanical coupling, and increasing the release of said right front pressure in response to such detection if a slip speed of the right front wheel exceeds a calibrated value; and comparing the first and second ratios to a rear-to-front torque transfer threshold to detect a third torque transfer condition in which the rear wheels are decelerating the left or right front wheels through the mechanical coupling, and increasing the release of said rear pressure in response to such detection if a slip speed of the rear wheels exceeds a calibrated value.

* * * * *